(12) United States Patent
High et al.

(10) Patent No.: US 11,565,424 B2
(45) Date of Patent: Jan. 31, 2023

(54) SYSTEM AND METHOD FOR TASK ASSIGNMENT MANAGEMENT

(71) Applicant: Walmart Apollo, LLC, Bentonville, AR (US)

(72) Inventors: Donald R. High, Noel, MO (US); Robert Cantrell, Herndon, VA (US); Mike Atchley, Eureka Springs, AR (US); Wallace Carrell King, Rogers, AR (US); Brian Harrison, Bentonville, AR (US); Amy J. Savaiinaea, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 164 days.

(21) Appl. No.: 17/177,853

(22) Filed: Feb. 17, 2021

(65) Prior Publication Data

US 2021/0170605 A1    Jun. 10, 2021

Related U.S. Application Data

(63) Continuation of application No. 16/448,179, filed on Jun. 21, 2019, now abandoned.

(51) Int. Cl.
*B25J 11/00* (2006.01)
*B25J 9/16* (2006.01)
(Continued)

(52) U.S. Cl.
CPC .......... *B25J 11/008* (2013.01); *B25J 9/1661* (2013.01); *B25J 9/1697* (2013.01); *B25J 19/023* (2013.01); *B25J 19/04* (2013.01)

(58) Field of Classification Search
CPC ........ B25J 19/023; B25J 11/008; B25J 19/04; B25J 9/1661; B25J 9/1697; G06Q 10/06311
See application file for complete search history.

(56) References Cited

U.S. PATENT DOCUMENTS 7,403,901 B1    7/2008  Carley et al.
8,121,874 B1    2/2012  Guheen et al.
(Continued)

OTHER PUBLICATIONS

Soltis, Design of a Small Busniness Data processing System,1981, IEEE, p. 77-93 (Year: 1981).*

(Continued)

*Primary Examiner* — Marc Mcdieunel
(74) *Attorney, Agent, or Firm* — Morgan, Lewis & Bockius LLP; Manita Rawat

(57) ABSTRACT

A computer-implemented method includes detecting, at a processor and by a plurality of associates, a mission to be performed by the plurality of associates; identifying the mission based on associated store information comprising an inventory status, sales data, and a set of predetermined rules; generating, by the processor, a queue of tasks to complete the mission based on priorities and dependencies of the tasks; determining a task for each associate whose profile defines best abilities matching a predetermined task dataset and the associated store information; assigning the queue of tasks to the plurality of the associates to complete the tasks; receiving, from each of the associates, a notification of a completion of an assigned task; verifying, by the processor, the completion of the assigned task; and determining, by the processor, completion of the mission when each task for the mission is verified to be completed.

20 Claims, 4 Drawing Sheets

Related U.S. Application Data

(60) Provisional application No. 62/689,757, filed on Jun. 25, 2018.

(51) Int. Cl.
    *B25J 19/04*      (2006.01)
    *B25J 19/02*      (2006.01)

(56) References Cited

U.S. PATENT DOCUMENTS

| | | |
|---|---|---|
| 8,694,350 B1 | 4/2014 | Cohen et al. |
| 10,474,574 B2* | 11/2019 | Yu .................. G06F 12/0822 |
| 2002/0078130 A1 | 6/2002 | Thornton et al. |
| 2009/0288030 A1 | 11/2009 | Wahl et al. |
| 2014/0047448 A1 | 2/2014 | Bishop et al. |
| 2014/0136255 A1 | 5/2014 | Grabovski et al. |
| 2016/0266930 A1 | 9/2016 | Jones et al. |
| 2017/0006135 A1 | 1/2017 | Siebel et al. |
| 2017/0131727 A1 | 5/2017 | Kurdi et al. |
| 2017/0168751 A1 | 6/2017 | Stevens et al. |
| 2018/0089278 A1 | 3/2018 | Bhattacharjee et al. |
| 2018/0225620 A1 | 8/2018 | Cantrell et al. |
| 2019/0295027 A1 | 9/2019 | Dunne et al. |
| 2019/0303807 A1 | 10/2019 | Gueye |
| 2019/0310977 A1 | 10/2019 | Pal et al. |
| 2019/0389074 A1* | 12/2019 | High .................. B25J 19/023 |
| 2020/0026580 A1 | 1/2020 | Bahramshahry et al. |
| 2022/0258773 A1* | 8/2022 | Narayanan .............. G06F 21/32 |

OTHER PUBLICATIONS

Mayer, Program Management with Configuration Control, 1963, IEEE, p. 467-473 (Year: 1963).*

Miloslavskaya et al., Information Security Maintenance Issues for Big Security-Related Data, 2017, IEEE, p. 361-366 (Year: 2017).*

Paz et al., The development of knowledge for maintenance management using simulation, 1994, IEEE, p. 574-593 (Year: 1994).*

Hanoun et al., Task Assignment in Camera Networks: A Reactive Approach for Manufacturing Environments, 2016, IEEE, p. 173-183 (Year: 2016).*

Mezei et al., Task assignment in wireless sensor and robot networks, 2012, IEEE, p. 596-602 (Year: 2012).*

International Search Report and Written Opinion dated Aug. 28, 2019, issued in corresponding PCT Application No. PCT/US2019/038425.

Miastrogiovanni et al.; "Semantic-Aware Real-Time Scheduling in Robotics", IEEE Transactions on Robotics, vol. 29, No. 1, Feb. 2013; pp. 118-135 (18 pages).

Deliri et al.; "Security-Aware Scheduling of Mission Tasks under Temporal Constraints", 2013, IEEE; pp. 452-457 (6 pages).

Brand et al.; "Model-based Prediction of Workload for Adaptive Associate Systems", 2017, IEEE; pp. 1722-1727 (6 pages).

Laplante et al.; "Real-Time Operating Systems", 2012, IEEE; pp. 79-147 (69 pages).

\* cited by examiner

SYSTEM AND METHOD FOR TASK ASSIGNMENT MANAGEMENT

CROSS REFERENCE TO RELATED APPLICATION

This Application is a Continuation of application Ser. No. 16/448,179 filed on Jun. 21, 2019, which claims priority to U.S. Provisional Application No. 62/689,757 filed on Jun. 25, 2018, the contents of both of which are incorporated herein in their entireties.

BACKGROUND

1. Technical Field

The present disclosure relates to a task assignment management system, and more specifically to a system and method for automatically generating a task queue assigned for completing a mission.

2. Introduction

Existing task management systems usually require human associates to enter multiple tasks for performing one mission into a management system. The multiple tasks for the mission may be required to be evaluated before being assigned to a store associates (e.g., robots) to perform. Some tasks may need to be conducted with higher priorities or depend on other tasks to be completed. The human associates may not be able to evaluate all possible resources and conditions to provide an optimized solution to assign a queue of tasks for a variety of store associates. It may also take time for the human associates to detect and assign tasks immediately for responding to some urgent activities in a store. Thus, efficiencies and effectiveness of an existing task management system are low, and computer power and resources are not utilized optimally.

There is a need for a system to manage the store operations by automatically detecting and evaluating tasks, and conducting task assignments to ensure that the tasks related to customer orders and inventory activities are handled effectively and optimally. As such, the efficiencies and effectiveness of an existing task management system can be enhanced, and computer power and resources are utilized with increased efficiency. Embodiments of the invention provide a role based system for identifying and processing tasks. Capabilities are associated with task recipients to complete a mission.

SUMMARY

An example computer-implemented method of assigning tasks to a plurality of associates to complete a mission disclosed herein can include: detecting, at a processor, the mission to be performed by analyzing data sent from the plurality of associates; in response to the detecting, identifying, by the processor, the mission based on an associated store information comprising an inventory status, sales data, and a set of predetermined rules; generating, by the processor, a queue of tasks to complete the mission based on priorities and dependencies of the tasks, wherein each task is prioritized based on a safety level and a timeliness for the associate to perform the task, and the sales data associated with the task; determining, by the processor, a task for each associate whose profile defines best abilities matching a predetermined task dataset and the associated store information, wherein an associate profile comprises an experience level, skills, a skill level, a location zone, a cost, and a speed to perform the task, and wherein the predetermined task dataset comprises a task value, dependency, skills required, and timeliness; assigning, by the processor, based on a determination for each associate, the queue of tasks to the plurality of the associates to complete the tasks; receiving, by the processor, from each of the associates, a notification of a completion of an assigned task; verifying, by the processor, the completion of the assigned task; and determining, by the processor, completion of the mission when each task of the queue of tasks for the mission is verified to be completed.

An example system configured according to the concepts and principles disclosed herein can include: a processor; one or more sensors in communication with the processor; and non-transitory computer-readable storage medium having instructions stored which, when executed by the processor, cause the processor to perform operations comprising: detecting the mission to be performed by analyzing data sent from the plurality of associates; in response to the detecting, identifying the mission based on an associated store information comprising an inventory status, sales data, and a set of predetermined rules; generating a queue of tasks to complete the mission based on priorities and dependencies of the tasks, wherein each task is prioritized based on a safety level and a timeliness for the associate to perform the task, and the sales data associated with the task; determining a task for each associate whose profile defines best abilities matching a predetermined task dataset and the associated store information, wherein an associate profile comprises an experience level, skills, a skill level, a location zone, a cost, and a speed to perform the task, and wherein the predetermined task dataset comprises a task value, dependency, skills required, and timeliness; assigning, based on a determination for each associate, the queue of tasks to the plurality of the associates to complete the tasks; receiving, by the processor, from each of the associates, a notification of a completion of an assigned task; verifying, by the processor, the completion of the assigned task; and determining, by the processor, completion of the mission when each task of the queue of tasks for the mission is verified to be completed.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Example embodiments of this disclosure are illustrated by way of an example and not limited in the figures of the accompanying drawings, in which like references indicate similar elements and in which.

Figure 1:
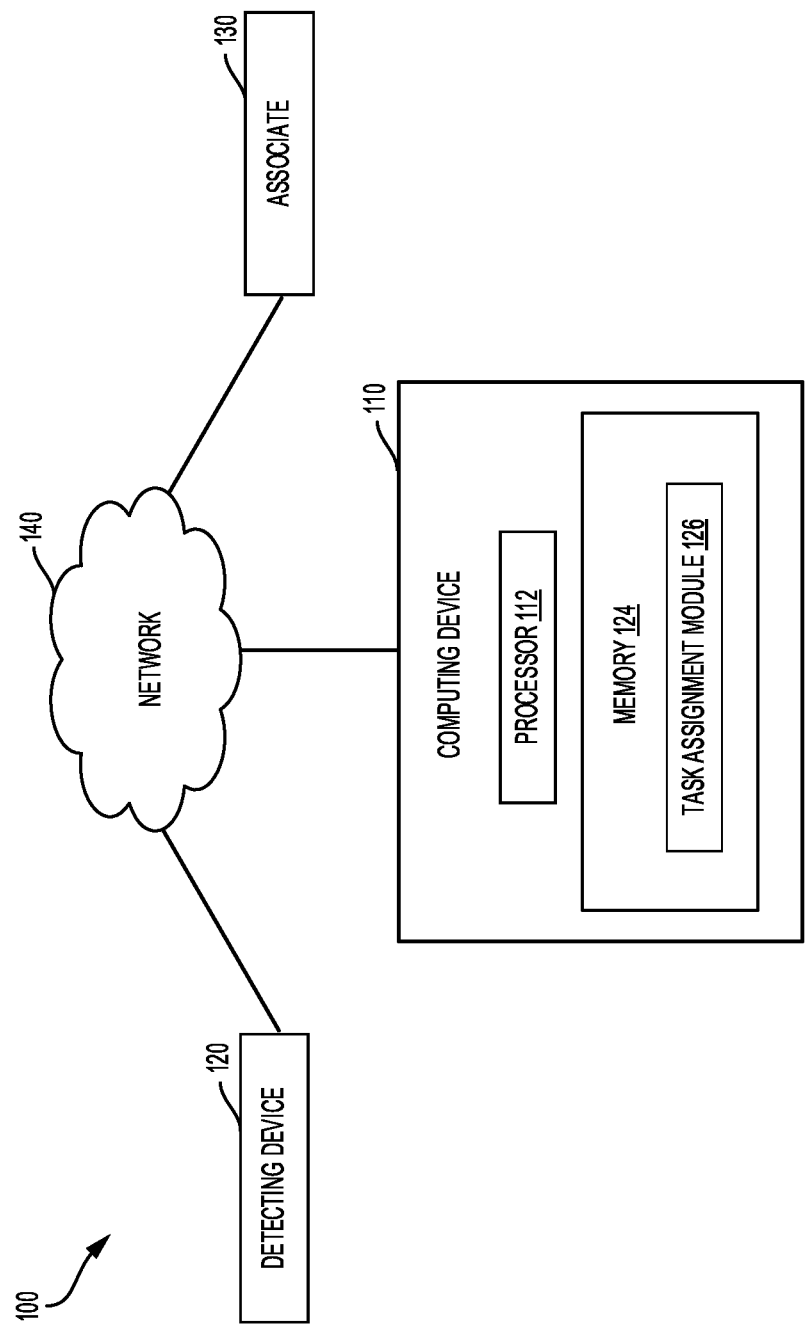
FIG. 1 is a block diagram illustrating an example system in which some example embodiments may be implemented.

It is to be understood that both the foregoing general description and the following detailed description are example and explanatory and are intended to provide further explanations of the invention as claimed only and are, therefore, not intended to necessarily limit the scope of the disclosure.

DETAILED DESCRIPTION

Various example embodiments of the present disclosure will be described in detail below with reference to the accompanying drawings. Throughout the specification, like reference numerals denote like elements having the same or similar functions. While specific implementations and example embodiments are described, it should be understood that this is done for illustration purposes only. Other components and configurations may be used without parting from the spirit and scope of the disclosure, and can be implemented in combinations of the variations provided. These variations shall be described herein as the various embodiments are set forth.

The concepts disclosed herein are directed to a task management system to facilitate operations in a retail store. The task management system may use a plurality of store robots and automated machines to detect missions which need to be undertaken and to automatically generate tasks for each mission. Each mission may include a plurality of tasks for store associates (e.g., humans, store robots and automated machines) to process and complete. The task management system may detect signals or data transmitted by a plurality of detecting devices such as cameras, sensors, robots of the retail store. In response to the detected signals and data, the task management system may generate tasks and assign queued tasks to store associates to perform and complete the mission.

The task management system provides an automatic way for the store associates to receive and perform assigned tasks efficiently, which may improve an efficiency and reduce costs for store operations and inventory management.

FIG. 1 is a block diagram illustrating an example task management system 100 in which some example embodiments may be implemented. The example task management system 100 may include a computing device 110, a plurality of detecting devices 120, a plurality of associates 130, and one or more database (not shown). These elements may communicate with each other and other components via network 140.

The computing device 110 may be in some embodiments a local server or a computer terminal located at the retail store. The computing device 110 may include a processor 112 and a memory 124. The computing device 110 may further comprise a task assignment module 126. The task assignment module 126 may be software modules or applications stored in the memory 124 and to be executed by the processor 112 of the computing device 110. The task management system 100 may receive signals or data from the detecting devices 120, for example, in real time to detect missions and generate queued tasks for each mission. Missions or tasks may also be entered into the task management system 100 manually. The task management system 100 may assign the queued tasks to the plurality of associates 130 to complete the mission.

A mission may be defined as a queue of tasks. Each of the queued tasks should be performed to complete the mission. For example, to stock a case of green beans on a side counter may include the following tasks which need to be undertaken: 1) find the case in back room; 2) obtain the case; 3) bring the case to the side counter; 4) remove cans from the case; 5) stock green bean cans in the side counter; 6) update inventory; 7) return empty case to the back room; 8) place cardboard in a recycler, etc.

Each task may be associated with a predetermined task dataset (e.g., a genome) which may include task value, dependency, timeliness, recurrence, skills required, location data, material required, risk, an awake cycle for continuous improvement, etc. Each task may be automatically assigned to an associate to complete by matching pre-defined rules associated with the store, the tasks and the associates. A task may be assigned to an associate with best experience or skills. A queue of tasks can be automatically generated for a mission based on priorities and dependencies of the tasks. Prioritization for tasks may facilitate determining whether a task needs to be assigned to the best able, the best trainable, or defining ability by other advantages such as speed or value. Task dependencies are relationships among the tasks which determine the order in which tasks need to be performed. A given task may be dependent upon another task being completed. Some of the queued tasks in a particular mission may be completed in a sequential order while other tasks in the mission may be completed in parallel. In various embodiments, the queued tasks in a mission may be completed sequentially, simultaneously, or in order. For example, a mission may include a task A and a task B. In a sequential manner, the task A needs to be completed before the task B starts. In a parallel manner, the task A and the task B can be performed at the same time but the task A needs to be completed before the task B finishes.

The detecting devices 120 may include store cameras, sensors, and robots for monitoring store facilities or any type of activities.

The task management system 100 may use the following sensors to collect data and create tasks:
1) Weather sensor;
2) Precipitation sensor;
3) Image sensor to capture and analyze to determine the number of carts in the corral, the parking lot, etc.;
4) Image sensor to capture and analyze to determine the number of cars in the parking lot.

For example, data received from a precipitation sensor may detect water dripping at a location in the retail store. For example, the precipitation sensor may detect an occurrence of moisture in the location to determine the occurrence of the water dripping. A task may be triggered when the detected moisture in the location is above a pre-specified moisture threshold. This may cause the task management system 100 to generate a task for a floor cleaning robot to navigate to the location and clean the water in the store area. In another example, a detecting device may detect that an item is out of stock on a shelf. A task may then be created for a store associate to stock the item immediately or in a specific time period.

The detecting devices 120 may be also mobile devices or other computing devices which communicate with the computing device 110 for detecting and reporting activities and situations in facilities in the retail store. In some example embodiments, an application with encoded instructions may be installed on the mobile devices for facilitating activities in the retail store. The installed mobile application may be sued to create a user account, search for product information, submit requests to the task management system 100, place orders, find navigation support in the store, review personal order history, etc. The mobile application may allow to take photos, record videos, and upload metadata to the computing device 110. As such, spills, clogged toilets, outages, hazardous or emergency conditions, etc. may be reported.

An associate 130 may be assigned a task by the task management system 100 based on various conditions. The task management system 100 may match the predetermined rules associated with the store, the task and the associate to determine to which associate the task may be assigned. The associate 130 may receive and communicate with the task management system 100 to receive tasks and update task status. In various embodiments, an associate profile may be configured based on experience level, skills, skill level, cost, speed, dependency, availability, or any other attributes associates with associate's performance. An associate's availability status may be indicated as "available' and "busy".

Upon completing a task, the associate 130 can send a notification to the task management system 100 and report a completion of the task. After the task management system 100 receives a completion notification, the task management system 100 may be able to verify whether the task is completed. In some examples, this is done via a video analytics. The video analytics may identify when certain tasks are completed by analyzing videos captured by the cameras. For example, the videos captured by the cameras may show how the task was completed by the associate 130. The task management system 100 may also compare the video captured prior to the completion of the task with the corresponding video captured after the completion of the task to confirm the completion of the task. For example, a liquid spill shown in the video captured prior to the completion of the task does not appear in the corresponding video captured after the completion of the task. This can confirm the completion of the task for cleaning up the liquid spill. Other tasks may require electronic communication means for retrieving from the memory 124 sensor data captured by the detecting devices 120. When each task of the mission is verified as "completed," the mission is determined to be "completed." When completion of an assigned task is verified, the task management system 100 may update the associate's availability status as "available" to receive a new task. The new task may be for another mission or another task within the same mission. The task management system 100 may also label the task or mission as "completed," remove the priority of the task or mission, delete the dependency of the task or mission if the task or mission is dependent on another task or mission, remove the captured videos associated with the task or mission in order to release computing power and storage space of the task management system 100, etc.

In some embodiments, the queued tasks may be automatically generated and assigned to a suitable associate (robots or human). In one embodiment, human assistants may be assigned to complete some specific tasks and to communicate with the task management system 100 via the mobile devices for updating task process and availability.

In some embodiments, the associates 130 may be robots or automated machines capable of performing an assigned task by carrying out designated actions. In some embodiments, robots may be unmanned vehicles to fulfill the assigned tasks, such as moving products to different places in the store, restoring the product to the sales floor or store shelves, conducting normal inventory scans, etc.

Figure 2:
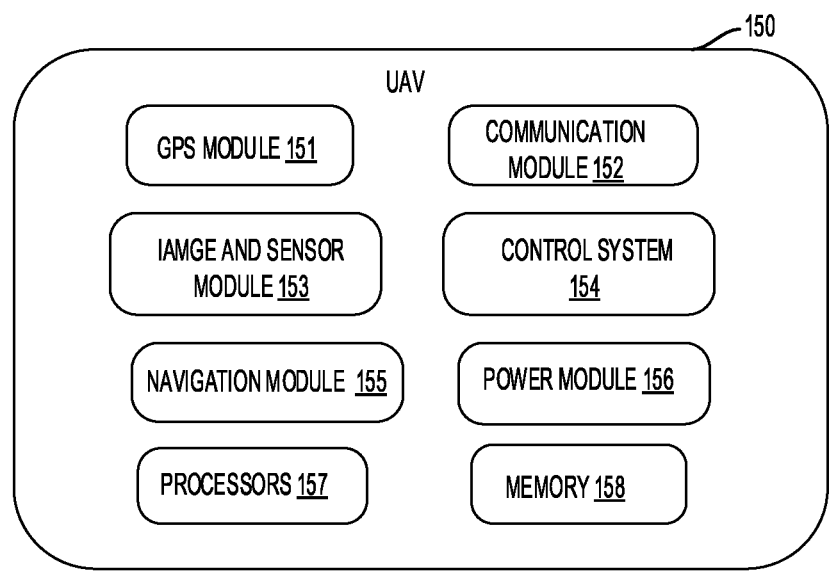
FIG. 2 is a diagram illustrating an example unmanned vehicle in accordance with some embodiments of the present invention.

FIG. 2 is a block diagram of an example unmanned automated vehicle 150 in which some example embodiments may be implemented. The unmanned vehicle 150 may include a GPS module 151, a communication module 152, an image and sensor module 153, a control system 154, a navigation module 155, a power module 156, processors 157, a memory (data storage) 158, and other mechanical components. The communication module 152 may allow the unmanned automated vehicle 150 to communicate with computing devices or processors in the task management system 100 for moving products. The communication module 152 may utilize cellular, radio frequency, near field communication, infrared, Bluetooth, Wi-Fi, satellite, or any other means for communication. The image and sensor module 153 may include one or more visual sensors, proximity sensors, and other types of sensors. These sensors and GPS modules 151 may be placed on one or more surfaces of the unmanned automated vehicle 150, determine positioning information for the unmanned automated vehicle 150, guide the unmanned automated vehicle 150 navigating to a destination, and conduct specific functions or data analysis. The unmanned automated vehicle 150 can communicate with an inventory replenishment system via the communication module 152.

Referring back to FIG. 1, the task management system 100 may further maintain a database to save information associated with the store associates, a store navigation system, historical sales data and product information of each of the products in the inventory of the retail store. The store navigation system may be used by the associates to route in and around the retail store to identify missions and perform assigned tasks.

Figure 3:
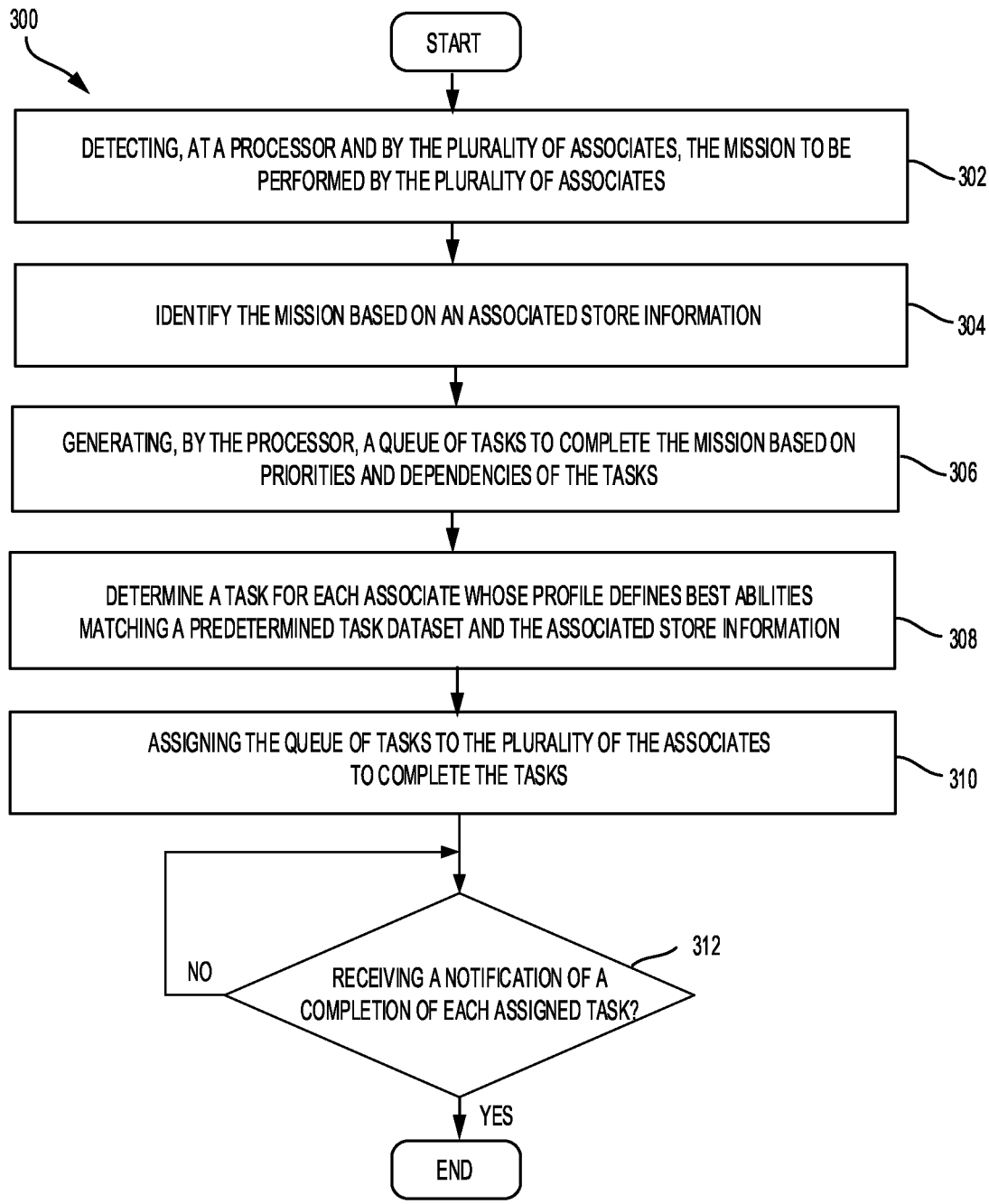
FIG. 3 is a flowchart diagram illustrating a process for task assignment management in accordance with some example embodiments of the present invention.

FIG. 3 is a flowchart diagram illustrating an example process 300 for implementing task assignment in accordance with some example embodiments. The example process 300 may be implemented in the above described systems and may include the following steps. Steps may be omitted, combined, or operated in different orders depending on the operations being performed.

At step 302, the task assignment module 126 may detect a mission by analyzing data sent from the plurality of associates. The plurality of associates may be store robots which are equipped with on-board sensors or cameras and are assigned routine store operation tasks, such as conducting a normal inventory scan. The robots can detect using their sensors or cameras various activities which comprise tasks of the mission. For example, if the online inventory system shows the product is "in stock", the robot may detect a product is "out of stock" on a store shelf and send a recorded video to the computing device 110. The computing device 110 may be able to analyze the received data, compare it with store information in the online inventory system, detect and report the problem immediately.

At step 304, in response to the detected data, the task assignment module 126 may identify the mission based on associated store information which includes an inventory status, sales data, and a set of predetermined rules. The task assignment module 126 may be able to access a database to obtain an inventory status and sales data of the product pattern and to determine the number of products needed to be restocked to the shelf. The task assignment module 126 may identify a mission to restore a number of products to a shelf immediately or within a period of time. Based on associated store information comprising an inventory status, sales data, and a set of predetermined rules, a corresponding plurality of tasks about how to restock the "out of stock" product may be generated. Once the system identifies the mission, the plurality of tasks for the mission may be generated by the task assignment module 126 of the processor 112.

At step 306, the task assignment module 126 of the processor 112 may generate a plurality of tasks to complete the mission based on priorities and dependencies of the tasks. A given task may be dependent upon another task being completed. For example, the plurality of tasks to restock the "out of stock" product may include getting the required amount of products from a higher shelf in the inventory room or backroom of the store, putting the products into a cart, moving the cart to the sales floor, restocking the products to the shelf, and returning the cart to the backroom. The tasks of the mission may be performed sequentially. Based on the mission requirement to restock a number of products to a shelf immediately or within a period of time, each task is prioritized based on a safety requirement and a timeliness for the associate to perform the task, and the sales data associated with the task. The timeliness of the task is related to whether the task is time-bounded or whether the task has been in a queue too long.

At step 308, the process may determine a task for each associate whose profile defines best abilities matching a predetermined task dataset and the associated store information. An associate profile may include an experience level, skills, a skill level, a location zone, a cost, and a speed to perform the task. The predetermined task dataset may comprise task value, dependency, skills required, task timeliness, location data, priority, material required, recurrence, a risk to perform a task, a lost opportunity cost, and an awake cycle for continuous performance. In some embodiments, the system may mainly depend on the task dataset, such as the task value, dependency, skills required, and timeliness, to determine the task for the associate.

The task management system 100 may match the store information associated with the mission, the task dataset and the associate profile in order to determine a task for each associate. In one embodiment, prioritization for tasks may assist in determining whether a task is assigned to an associate with the best experience level, best skills, be trainable or defining abilities by considering other advantages such as speed or cost.

At step 310, based on a determination for each associate at step 308, the task assignment module 126 may assign the queue of tasks to the plurality of associates to complete the mission.

At step 312, the task management system 100 may receive a notification of a completion of an assigned task from each associate. Upon completing the assigned task, the associate sends a notification to the computing device 110. In some embodiments, the task management system 100 may have a distributed video analytics system to identify the completion of the assigned task in order to inform the computing device 110 to update the availability and location data in the associate's profile. The process in the step 312 may check whether all of assigned tasks are completed to determine an end of the mission. As such, the associate may be ready to take a task immediately after completing an assigned one.

In one embodiment, the task management system 100 may learn over time by observing trends in which tasks an associate gravitates towards. Similarly, the task management system 100 may learn that a particular task is needed after a completion of a mission. The task management system 100 may learn to assign the task when it is aware of a new mission coming up.

In some embodiments, the task assignment module 126 may detect a mission by analyzing signals sent from cameras and sensors installed in or outside the store. For example, when a truck crosses the geo-fence of the store, a set of missions/tasks may be automatically generated and assigned to a suitable associate (robots or human). Tasks may be assigned to resources in real time. The task management system 100 may maintain a queue of missions, tasks and priorities which are updated in real-time.

In another example, a precipitation sensor may detect a humidity level in a store area which is above a normal level. The computing device 110 may receive a video sent from a camera embedded with or nearby the precipitation sensor. By analyzing the detected humidity level and video data, the task assignment module 126 may identify a mission for a floor clean robot to route to the accident area to clean the floor. The task management system 100 may verify completion of the mission by comparing a detected humidity level and a video prior to the completion of the mission with the detected humidity level and the video after the completion of the mission. For example, the detected humidity level after the completion of the mission may be significantly lower than the detected humidity level prior to the completion of the mission, so the task management system 100 can determine the mission is completed. When the spill shown in the video captured prior to the completion of the mission does not appear in the corresponding video captured after the completion of the task, the task management system 100 can determine the mission is completed. In one embodiment, the tasks could carry over from shift to shift, day to day, and week to week. Some tasks may be automatically triggered and generated based upon store information, demographics, and weather data output from store sensors.

In some embodiment, based on associate profiles and the predetermined task dataset of a task, the task management system 100 may consider the following factors when assigning a task to an associate.

1) Identify the associate(s) which are able to complete the task;
2) Determine the cost associated with each associate;
3) Determine the priority of the task;
4) Determine the duration of the task; and
5) Determine the lost opportunity cost of the task.

In one embodiment, the task management system 100 can make the missions, tasks and costs visible to a management person. Tasks and associates may be supervised by the management person from different departments. A manager may be able to monitor task progress, adjust or reassign tasks to different associates when needed, add and assign a task to an associate, remove a task, generate mission status reports, etc.

In one embodiment, the task management system 100 may be able to alert an associate to a task which happens to be in the vicinity of the associate. In one embodiment, the task management system 100 can change the priority of a task based on proximity between two tasks. The task management system 100 can also switch the tasks between the associates when needed.

In some embodiments, the task management system 100 may maintain a queue of missions, tasks and priorities which are updated in real-time. Tasks may be required to be completed immediately, completed today or completed based on various parameters in the associate's profile such as experience level, skills, a speed, etc.

In some embodiments, the gamification of the task management system may be carried out by assigning points to each task. Teams of associates can be established for multiple missions and competition may foster compliance.

The task management system 100 may also consider the required resources or the preferred resources for a given task. The task management system 100 may weigh the cost associated with the use of a resource to complete a task and may also weigh the lost opportunity cost. For example, if the robot stops a task "A" and diverts to a task "B", the task management system 100 may decide what other resources need to take over and complete the task "A". The task management system 100 may use artificial intelligence to create, assign and declare tasks.

Figure 4:
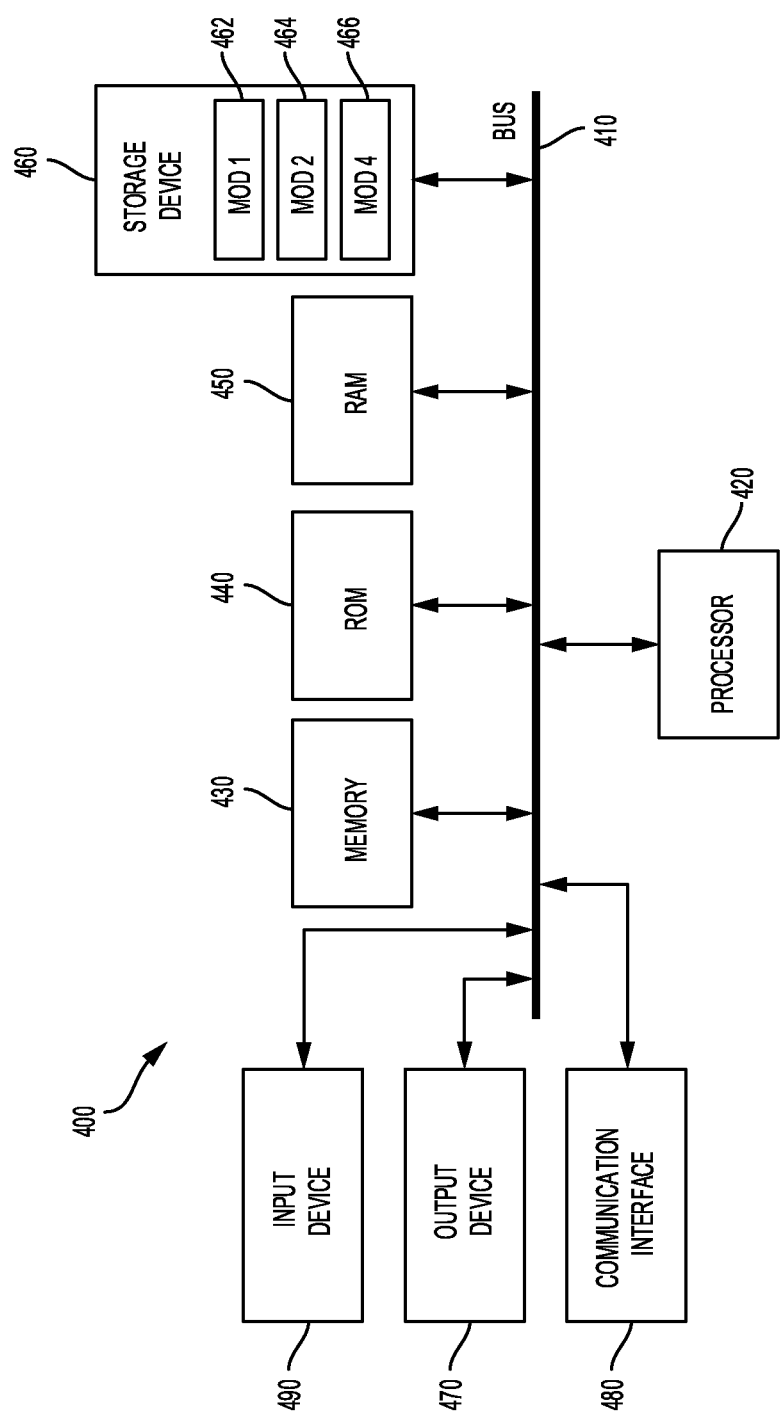
FIG. 4 is a block diagram illustrating an example computer system in which some example embodiments may be implemented.

FIG. 4 illustrates an example computer system 400 which can be used to perform the processes for egg quality control as disclosed herein. The exemplary system 400 can include a processing unit (CPU or processor) 420 and a system bus 410 that couples various system components including the system memory 430 such as read only memory (ROM) 440 and random access memory (RAM) 450 to the processor 420. The system 400 can include a cache of high speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function.

In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A computer-implemented method for assigning tasks to a plurality of associates to complete a mission, the method comprising:
    detecting, at a processor, the mission to be performed by analyzing data sent from the plurality of associates;
    in response to the detecting, identifying, by the processor, the mission based on associated store information comprising an inventory status, sales data, and a set of predetermined rules;
    generating, by the processor, a queue of tasks to complete the mission based on priorities and dependencies of the tasks, wherein each task is prioritized based on a safety level and a timeliness for the associate to perform the task, and the sales data associated with the task;
    determining, by the processor, a task for each associate whose profile defines best abilities matching a predetermined task dataset and the associated store information, wherein an associate profile comprises an experience level, skills, a skill level, a location zone, and a cost, and wherein the predetermined task dataset comprises a task value, dependency, skills required, and timeliness;
    assigning, by the processor, based on the determining, for each associate, the queue of tasks to the plurality of the associates to complete the tasks;

receiving, by the processor, from each of the associates, a notification of a completion of an assigned task;

verifying, by the processor, the completion of the assigned task; and determining, by the processor, completion of the mission when each task of the queue of tasks for the mission is verified to be completed.

2. The method of claim 1, wherein the predetermined task dataset further comprises location data, priority, material required, recurrence, a risk to perform a task, a lost opportunity cost, or an awake cycle for continuous performance.

3. The method of claim 2, wherein assigning the queue of tasks to the plurality of the associates further comprises, based on associate profiles and the predetermined task dataset of a task:

identifying the associates which are able to complete the task based on the associate profiles;

determining the cost to perform the task associated with each associates;

determining the priority of the task;

determining a duration of the task; and determining the lost opportunity cost of the task.

4. The method of claim 1, further comprising:

detecting, at the processor, the mission to be performed by the plurality of associates by analyzing signals sent from one or more sensors.

5. The method of claim 1, further comprising:

identifying, by a distributed image analytics system, a completion of the assigned task.

6. The method of claim 1, wherein the plurality of associates are robots.

7. The method of claim 1, wherein each task is prioritized based on the safety level and timeliness for the associate to perform the task, and the sales data related to the task.

8. The method of claim 1, wherein the tasks are completed sequentially to complete the mission.

9. The method of claim 1, wherein the tasks are completed in parallel to complete the mission.

10. The method of claim 1, wherein the timeliness of the task is defined to be a time to perform the task and a period of time to complete the task.

11. A system for assigning tasks to a plurality of associates to complete a mission, the system comprising:

a processor;

one or more sensors in communication with the processor; and non-transitory computer-readable storage medium having instructions stored which, when executed by the processor, cause the processor to perform operations comprising:

detecting the mission to be performed by analyzing data sent from the plurality of associates;

in response to the detecting, identifying the mission based on an associated store information comprising an inventory status, sales data, and a set of predetermined rules;

generating a queue of tasks to complete the mission based on priorities and dependencies of the tasks, wherein each task is prioritized based on a safety level and a timeliness for the associate to perform the task, and the sales data associated with the task;

determining a task for each associate whose profile defines best abilities matching a predetermined task dataset and the associated store information, wherein an associate profile comprises an experience level, skills, a skill level, a location zone, a cost, and a speed to perform the task, and wherein the predetermined task dataset comprises a task value, dependency, skills required, and a task timeliness;

assigning, based on a determination for each associate, the queue of tasks to the plurality of the associates to complete the tasks;

receiving, by the processor, from each of the associates, a notification of a completion of an assigned task;

verifying, by the processor, the completion of the assigned task; and determining, by the processor, completion of the mission when each task of the queue of tasks for the mission is verified to be completed.

12. The system of claim 11, wherein the predetermined task dataset further comprises location data, priority, duration, material required, recurrence, risk to perform a task, a lost opportunity cost, and an awake cycle for continuous performance.

13. The system of claim 12, wherein assigning the queue of tasks to the plurality of the associates further comprising, based on associate profiles and the predetermined task dataset of a task:

identifying the associates which are able to complete the task based on the associate profiles;

determining the cost to perform the task associated with each associates;

determining the priority of the task;

determining the duration of the task; and determining the lost opportunity cost of the task.

14. The system of claim 11, further comprising the instructions executed to cause the processor to perform the operations comprising:

detecting, at the processor, the mission to be performed by the plurality of associates by analyzing signals sent from the one or more sensors.

15. The system of claim 11, wherein the plurality of associates are robots.

16. The system of claim 11, wherein a distributed video analytics system is used to identify the completion of the assigned task.

17. The system of claim 11, wherein each task is prioritized based on the safety level and timeliness for the associate to perform the task, and the sales data related to the task.

18. The system of claim 11, wherein the tasks are completed sequentially to complete the mission.

19. The system of claim 11, wherein the tasks are completed in parallel to complete the mission.

20. The system of claim 11, wherein the timeliness of the task is defined to be a time to perform the task and a period of time to complete the task.

* * * * *